(12) United States Patent
Kumano

(10) Patent No.: US 7,982,334 B2
(45) Date of Patent: Jul. 19, 2011

(54) MOTOR-DRIVEN STEERING LOCK APPARATUS

(75) Inventor: Masakazu Kumano, Hiroshima (JP)

(73) Assignee: U-Shin Ltd., Tokyo (JP)

( * ) Notice: Subject to any disclaimer, the term of this patent is extended or adjusted under 35 U.S.C. 154(b) by 220 days.

(21) Appl. No.: 12/506,549

(22) Filed: Jul. 21, 2009

(65) Prior Publication Data

US 2010/0018265 A1    Jan. 28, 2010

(30) Foreign Application Priority Data

Jul. 24, 2008   (JP) ................................. 2008-191201

(51) Int. Cl.
*B60R 25/04* (2006.01)
*B60R 25/02* (2006.01)

(52) U.S. Cl. ........................................ 307/10.3; 70/252

(58) Field of Classification Search ................. 307/10.3; 70/252

See application file for complete search history.

(56) References Cited

U.S. PATENT DOCUMENTS

| 7,049,931 | B2 | 5/2006 | Hayashi et al. |
| 7,145,264 | B2* | 12/2006 | Nagae et al. ................. 307/10.2 |
| 7,362,006 | B2* | 4/2008 | Otani et al. ................... 307/10.3 |
| 7,582,984 | B2* | 9/2009 | Schindler et al. ............ 307/10.3 |
| 7,781,906 | B2* | 8/2010 | Murakami et al. ........... 307/10.2 |
| 2004/0027239 | A1 | 2/2004 | Hayashi et al. |

FOREIGN PATENT DOCUMENTS

JP    2002-308050    10/2002

* cited by examiner

*Primary Examiner* — Michael Rutland Wallis
(74) *Attorney, Agent, or Firm* — Wenderoth, Lind & Ponack, L.L.P.

(57) ABSTRACT

The invention provides a motor-driven steering lock apparatus which can improve a reliability of locking and unlocking operations, with a simple circuit structure. A power supply line from a battery and a driving means are connected by a switching means only at a time when a feed signal from a host first control means to a drive control means (CPU), a power supply-enabling signal from the host first control means and a power supply-enabling signal from a host second control means are input to the switching means.

4 Claims, 3 Drawing Sheets

MOTOR-DRIVEN STEERING LOCK APPARATUS

BACKGROUND OF THE INVENTION

1. Field of the Invention

The present invention relates to a motor-driven steering lock apparatus.

2. Description of the Related Art

Conventionally, for example, a motor-driven steering lock apparatus of Japanese Unexamined Patent Publication No. 2002-308050 is structured such that a switch means is provided in a power supply line to an electric motor driving a lock bolt, and a power supply to the electric motor during traveling is interrupted by the switch means based on a signal from an external power supply control apparatus, for preventing the lock bolt from carelessly locking during traveling of a vehicle.

However, the power supply line to an internal CPU controlling a driving direction of the electric motor is provided independently from the power supply line to the electric motor so that the internal CPU can carry out the other controls than the drive control of the electric motor even during traveling.

Accordingly, the power supply is continuously fed to the internal CPU, and a standby current is consumed even in the case of a sleep state. Further, there is a possibility that the internal CPU produces an improper operation during traveling of the vehicle.

Then, the structure may be made such that a switch means is provided in the power supply line of the internal CPU, and the power supply to the internal CPU is interrupted during traveling. However, it is necessary to provide a signal line for inputting a control signal in the switch means, causing a circuit structure to become complicated. Further, as described in FIG. 11 of Japanese Unexamined Patent Publication No. 2002-308050, if the switch means is provided in the power supply line for feeding the power to the internal CPU and the electric motor, and the power supply to the both is interrupted during traveling, only the internal CPU cannot be started during traveling, making it impossible to execute the other controls (such as a confirmation of a lock and unlock state of a lock bolt during traveling of the vehicle) by the internal CPU.

DISCLOSURE OF THE INVENTION

An object of the present invention is to provide a motor-driven steering lock apparatus which can improve a reliability of locking and unlocking operations with a simple circuit structure.

To achieve the above object, in a first aspect of the present invention, a motor-driven steering lock apparatus provided with a lock bolt which is movable to a lock position engaging with a steering shaft of a vehicle and an unlock position releasing from the steering shaft, a driving means driving the lock bolt to the lock position and the unlock position, and a drive control means controlling the driving means, the motor-driven steering lock apparatus includes: a host first control means having a feed line feeding a power supply to the drive control means; a host second control means carrying out a different control from the host first control means and the drive control means; and a switching means connecting and interrupting a power supply line from a battery based on a feed signal indicating a matter that the drive control means is fed from the host first control means via the feed line, a power supply-enabling signal from the host first control means, and a power supply-enabling signal from the host second control means, wherein the power supply line from the battery and the driving means are connected by the switching means only at a time when the feed signal from the host first control means to the drive control means, the power supply-enabling signal from the host first control means and the power supply-enabling signal from the host second control means are input to the switching means.

In a second aspect of the present invention, a motor-driven steering lock apparatus provided with a lock bolt which is movable to a lock position engaging with a steering shaft of a vehicle and an unlock position releasing from the steering shaft, a driving means driving the lock bolt to the lock position and the unlock position, and a drive control means controlling the driving means, the motor-driven steering lock apparatus includes: a host first control means having a feed line feeding a power supply to the drive control means; a host second control means carrying out a different control from the host first control means and the drive control means; and a switching means connecting and interrupting a power supply line from a battery based on a feed signal indicating a matter that the drive control means is fed from the host first control means via the feed line, a power supply-enabling signal from the host first control means, and a power supply-enabling signal from the drive control means, wherein the power supply line from the battery and the driving means are connected by the switching means only at a time when the feed signal from the host first control means to the drive control means, the power supply-enabling signal from the host first control means and the power supply-enabling signal from the drive control means are input to the switching means.

In the first and second aspects, the power supply-enabling signal from the host first control means is preferably an ignition signal.

According to the present invention constructed by each of the means mentioned above, since the electric power is not fed to the driving means from the battery in the state in which the power feed from the host first control means to the drive control means is interrupted, the malfunction of the driving means can be securely prevented, and making it possible to secure a safety and a reliability.

Since the power feed to the drive control means is carried out by the host first control means, and the power feed to the driving means is carried out from the battery via the switching means, only one switching means is sufficient, and it is possible to simplify the control circuit.

Further, in accordance with the first means, even if the host first control means gets out of order, so as to be kept feeding to the drive control means, the driving means is not fed until the host second control means outputs the power supply-enabling signal. Further, even if the host second control means gets out of order, so as to lie outputting the power supply-enabling signal, the driving means is not fed until the host first control means outputs the feed signal. Further, even if the drive control means gets out of order, so as to lie outputting the drive signal to the driving means, the driving means is not fed until the feed signal of the host first control means and the power supply-enabling signal of the host second control means are output. Since the steering shaft is not locked during traveling of the vehicle unless a plurality of control means get out of order all together, it is possible to secure a high safety.

Further, in accordance with the second means, even if the host first control means gets out of order, so as to lie feeding to the drive control means, the driving means is not fed until the drive control means outputs the power supply-enabling signal. Further, even if the drive control means gets out of order, so as to lie outputting the drive signal to the driving means, the driving means is not fed until the feed signal of the host first control means is output. As mentioned above, since the steering shaft is not locked during traveling of the vehicle unless a plurality of control means get out of order all together, it is possible to secure a high safety.

DETAILED DESCRIPTION OF THE PREFERRED EMBODIMENTS

A description will be given below of an embodiment in accordance with the present invention with reference to the accompanying drawings.

Figure 1:
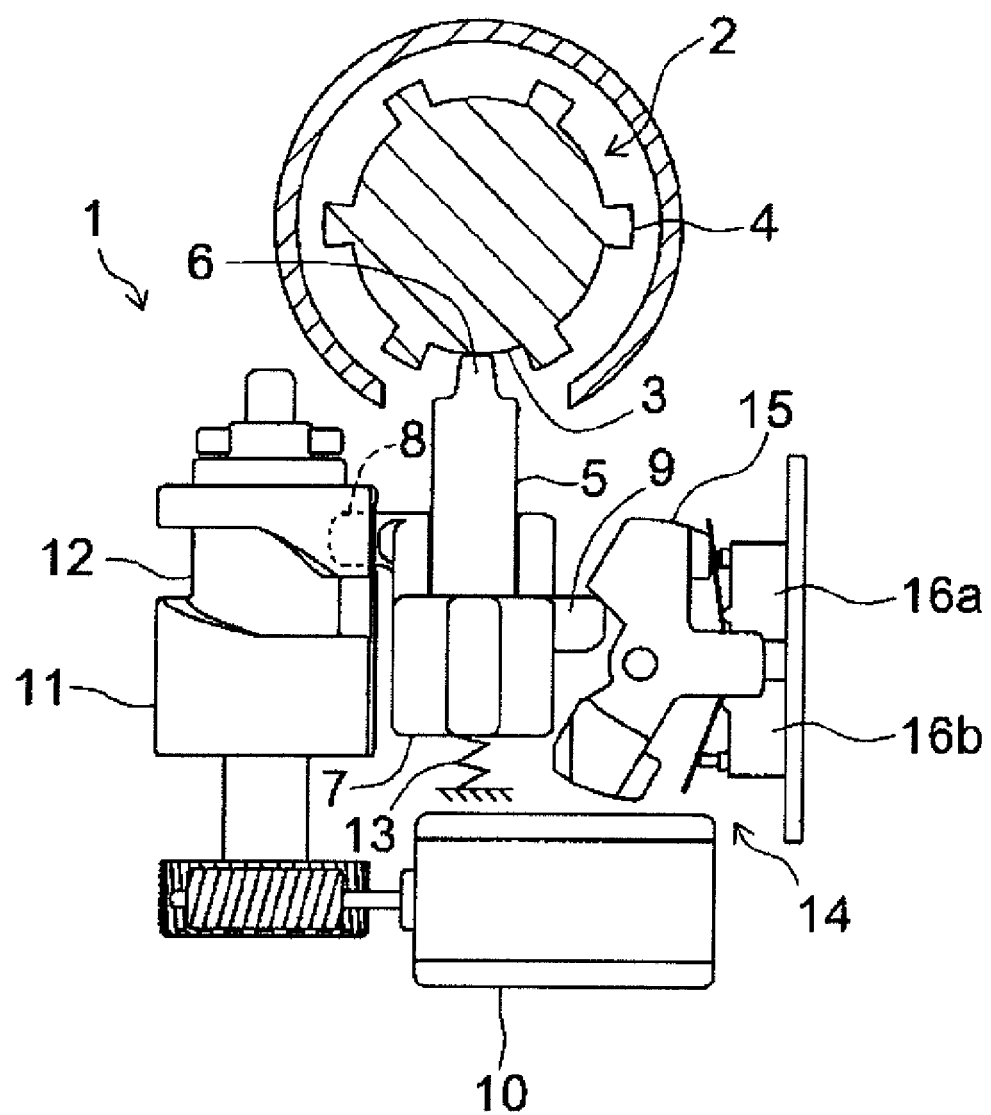
FIG. 1 is a mechanism view of a motor-driven steering lock apparatus in accordance with a first embodiment.

FIG. 1 is a mechanism view of a motor-driven steering lock apparatus 1 in accordance with the present invention. A plurality of concave portions 3 and convex portions 4 are alternately formed along an outer periphery of a steering shaft 2 serving as a movable member which works with a rotating motion of a steering wheel (not shown). A lock bolt 5 which is movable in a perpendicular direction to an axis of the steering shaft 2 is provided in the vicinity of the steering shaft 2. The lock bolt 5 has a leading end portion 6 which can be fitted to the concave portion 3 of the steering shaft 2 and a slider 7.

In the slider 7, a cam follower 8 and a switch-actuating portion 9 protrude in a perpendicular direction to an axis of the lock bolt 5. The cam follower 8 of the slider 7 is fitted into a cam groove 12 formed in an outer periphery of a cylindrical cam member 11 which is rotationally driven by an electric motor 10. If the cam member 11 is rotated based on a forward rotation and a reverse rotation of the electric motor 10, the lock bolt 5 moves forward and backward, and the leading end portion 6 is fitted into the concave portion 3 of the steering shaft 2, and releases from the concave portion 3. The switch-actuating portion 9 of the slider 7 is structured such as to actuate a position detecting mechanism 14 mentioned below. Further, the lock bolt 5 is energized by a spring 13 coming into pressure contact with the slider 7 in such a direction that the leading end portion 6 is fitted into the concave portion 3 of the steering shaft 2.

The position detecting mechanism 14 is constructed by a rotatable position block 15, and lock and unlock switches 16a and 16b. If the leading end portion 6 of the lock bolt 5 moves into and engages with the concave portion 3 of the steering shaft 2, the switch-actuating portion 9 turns on the lock switch 16a via the position block 15 so that a lock position is detected. If the leading end portion 6 of the lock bolt 5 releases from the concave portion 3 of the steering shaft 2, the switch-actuating portion 9 turns on the unlock switch 16b via the position block 15 so that an unlock position is detected.

Figure 2:
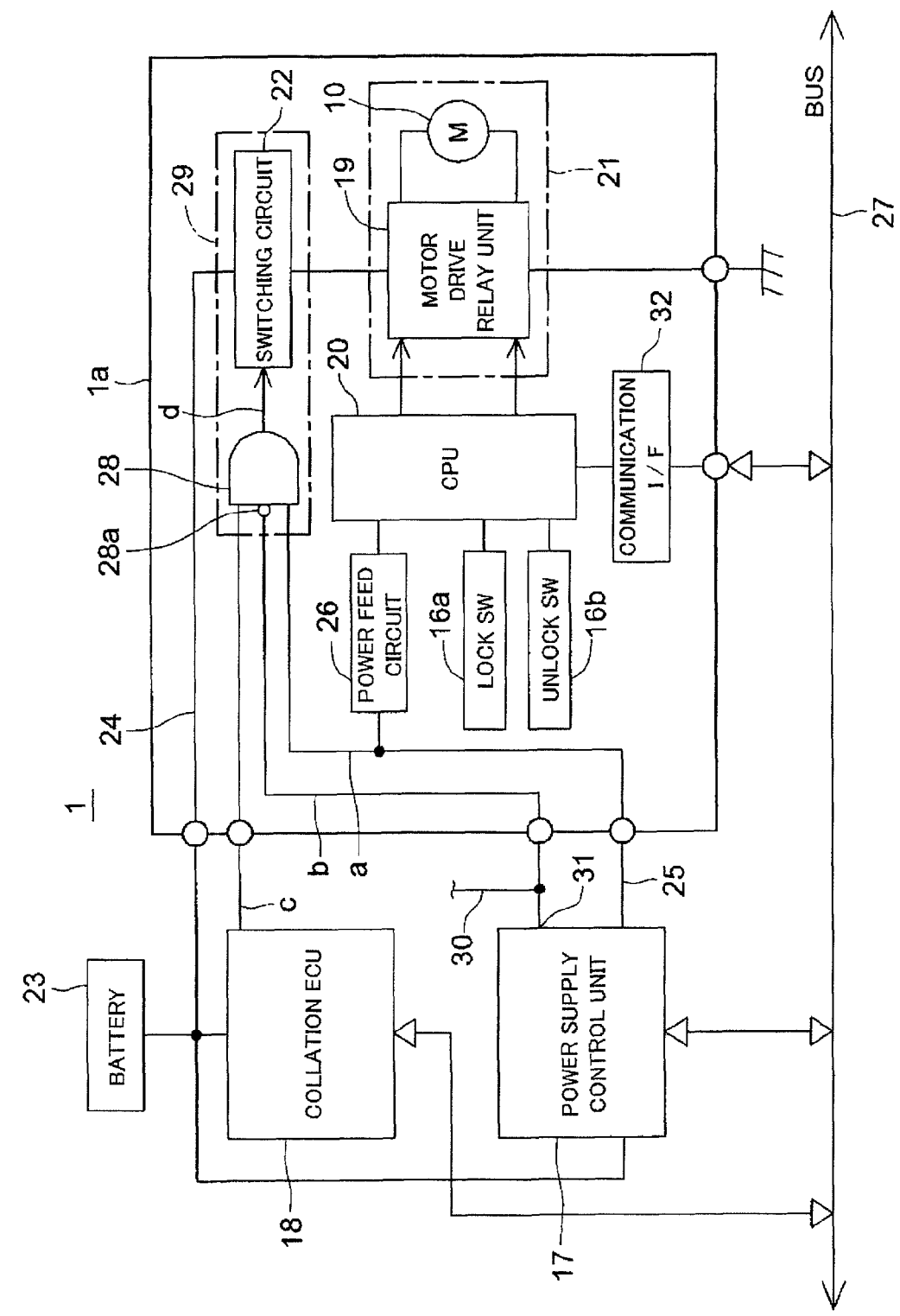
FIG. 2 is a circuit diagram of the motor-driven steering lock apparatus in accordance with the first embodiment in FIG. 1.

FIG. 2 shows a circuit diagram of the motor-driven steering lock apparatus 1 in accordance with a first embodiment. The motor-driven steering lock apparatus 1 has a motor-driven steering lock apparatus main body 1a, a power supply control unit 17 serving as a host first control means, and a collation ECU 18 serving as a host second control means.

The motor-driven steering lock apparatus main body 1a has an electric motor 10 driving the lock bolt 5, a motor drive relay circuit 19 feeding a power supply to the electric motor 10 so as to drive it, and a CPU 20 controlling the motor drive relay circuit 19 and serving as a drive control means in accordance with the present invention. The electric motor 10 and the motor drive relay circuit 19 construct a drive unit 21 serving as a driving means in accordance with the present invention.

An electric power is fed to the motor drive relay circuit 19 from a battery 23 via a switching circuit 22 through a power supply line 24. The motor drive relay circuit 19 is constructed by two relays, and switches a feed path to the motor 10 so as to forward rotate, reverse rotate, and stop the electric motor 10.

An electric power is fed to the CPU 20 from the power supply control unit 17 connected to the battery 23 via a power feed circuit 26 through a feed line 25. The power feed circuit 26 converts voltage from the power supply control unit 17 to such voltage that the CPU 20 can operate. The signals from the lock switch 16a and the unlock switch 16b are input to the CPU 20. The CPU 20 stores a program in a built-in ROM, and is structured such as to forward rotate and reverse rotate the electric motor 10 and lock and unlock the lock bolt 5 in accordance with a corresponding program to the control signal upon receiving the control signal from the power supply control unit 17 via a BUS line 27.

The switching circuit 22 is constructed by a relay and a transistor, and is controlled by an AND circuit 28. The switching circuit 22 and the AND circuit 28 construct a switching unit 29 serving as a switching means in accordance with the present invention. The AND circuit 28 is structured such as to output "on" signal to the switching circuit 22 via a signal line d, upon receiving input of "ESL power supply on" signal (feed signal) of a signal line a at a time when the electric power is fed to the CPU 20 from the power supply control unit 17 through the feed line 25, "IG power supply off" signal (power supply-enabling signal) of a signal line b at a time when the electric power is not fed to an IG power supply line 30 from the power supply control unit 17, and "motor power supply control signal on" signal (power supply-enabling signal) of a signal line c from the collation ECU 18.

The AND circuit 28 is provided with an inverter 28a converting an L level signal into an H level signal as well as converting the H level signal into the L level signal, in an input portion of the AND circuit 28 connected to the signal line b. In other words, the "IG power supply off" signal (L level signal) input from the signal line b is converted into the H level signal within the AND circuit 28.

The power supply control unit 17 is provided with an engine switch (not shown) for starting and stopping an engine, detects an operation of the engine switch, and carries out a control mentioned below. Further, the power supply control unit 17 has the feed line 25 mentioned above feeding the electric power to the CPU 20, and an IG output 31 feeding an IG power supply to an IG power supply line 30 serving as a path through which the electric current flows to an electronic fuel injection apparatus and the other electric parts of a vehicle.

The collation ECU 18 receives an ID code of an electronic key possessed by a user via an antenna mounted to the vehicle, compares with a previously stored certification code, and carries out a control determining whether or not the user possessing the normal electronic key is on the vehicle.

The CPU 20 is connected to a BUS line 27 via a communication I/F 32, and can be communicated with the power supply control unit 17 and the collation ECU 18.

Next, a description will be given of an operation of the steering lock apparatus 1 in accordance with the first embodiment having the construction mentioned above.

When the drive gets on the vehicle and turns on the engine switch, the power supply control unit 17 detects the on state of the engine switch, and feeds the power supply to the CPU 20 via the power feed circuit 26 through the feed line 25. Accordingly, the "ESL power supply on" signal from the signal line a and the "IG power supply off" signal from the signal line b are input to the AND circuit 28. At the same time, the power supply control unit 17 transmits the engine switch on signal to the collation ECU 18 via the BUS line 27.

The power supply control unit 17 transmits a status demand signal to the CPU 20 via the BUS line 27. The CPU 20 detects the position of the lock bolt 5 based on the signals from the lock switch 16a and the unlock switch 16b, and returns a status response signal to the power supply control unit 17.

When the collation ECU 18 receives the engine switch on signal from the power supply control unit 17, it communicates with the electronic key held by the driver getting on the vehicle, confirms whether or not the received ID code of the electronic key coincides with the previously stored ID code, and transmits a result of confirmation to the power supply control unit 17 via the BUS line 27. If the ID is okay, the collation ECU 18 outputs the "motor power supply control signal on" signal to the AND circuit 28 via the signal line c.

When the "ESL power supply on" signal, the "IG power supply off" signal, and the "motor power supply control signal on" signal are input to the AND circuit 28, the AND circuit 28 outputs an on signal, and turns on the switching circuit 22. Accordingly, the power supply from the battery 23 is fed to the motor drive relay circuit 19.

When the power supply control unit 17 receives the signal that the ID from the collation ECU 18 is okay, it transmits an unlock demand signal to the CPU 20 via the BUS line 27.

Accordingly, the CPU 20 switches two relays within the motor drive relay circuit 19, and rotates the electric motor 10 to the unlock side. When the unlock switch 16b is turned on, the CPU 20 stops the electric motor 10, and transmits a drive completion response signal to the power supply control unit 17 and the collation ECU 18 via the BUS line 27.

The power supply control unit 17 confirms the content of the drive completion response signal from the CPU 20, and if the unlock operation is normally carried out, the power supply control unit 17 interrupts the power supply to the CPU 20 as well as feeding the power supply to the IG power supply line 30 of the vehicle. Accordingly, the "ESL power supply off" signal is input to the AND circuit 28.

The collation ECU 18 outputs the "motor power supply control signal off" signal in correspondence to the drive completion response signal from the CPU 20. Accordingly, the AND circuit 28 outputs the off signal, and turns off the switching circuit 22. As a result, the power supply to the motor drive relay circuit 19 from the battery 23 is interrupted.

The power supply control unit 17 transmits an engine start demand signal to an engine starter (not shown) so as to start the engine.

If it is necessary to confirm the position of the lock bolt 5 at a time of driving the vehicle, the power supply control unit 17 turns on the ESL power supply, demands a status demand signal to the CPU 20, receives a status response signal from the CPU 20 so as to carry out a necessary process, and thereafter turns off the ESL power supply. As mentioned above, it is possible to start the CPU 20 only when needed. Even if the power supply to the CPU 20 is turned on, only the "motor power supply control signal on" is established among three input conditions "ESL power supply on", "IG power supply off" and "motor power supply control signal on" to the AND circuit 28, and the other conditions do not establish. Accordingly, the power supply to the electric motor 10 is in an off state. Therefore, the electric motor 10 erroneously carries out the lock operation during driving of the vehicle. Further, even if the internal relay actuates in such a manner as to lock the electric motor 10 due to a malfunction of the motor drive relay circuit 19, the electric motor 10 is not actuated because the power feed to the electric motor 10 is interrupted, making it possible to prevent the steering shaft from being unexpectedly locked.

Next, when the driver stops the vehicle and turns off the engine switch, the power supply control unit 17 detects the off state of the engine switch, and demands the engine stop to the engine starter. Accordingly, the engine stops.

The power supply control unit 17 confirms the engine stop from the engine starter, and interrupts the power supply to the IG power supply line 30 ("IG power supply off") as well as applying the power supply to the CPU 20 ("ESL power supply on").

The power supply control unit 17 transmits the status demand signal to the CPU 20 via the BUS line 27. The CPU 20 detects the position of the lock bolt 5 based on the signals from the lock switch 16a and the unlock switch 16b, and returns the status response signal to the power supply control unit 17.

Further, the power supply control unit 17 demands the "motor power supply control signal on" to the collation ECU 18. Accordingly, the collation ECU 18 outputs the "motor power supply control signal on" to the AND circuit 28.

When the "ESL power supply on", the "IG power supply off", and the "motor power supply control signal on" are input to the AND circuit 28, the AND circuit 28 outputs the on signal, and turns on the switching circuit 22. Accordingly, the power supply from the battery 23 is fed to the motor drive relay circuit 19.

The power supply control unit 17 transmits the lock demand signal to the CPU 20 via the BUS line 27.

Accordingly, the CPU 20 switches two relays within the motor drive relay circuit 19, and rotates the electric motor 10 to the lock side. When the lock switch 16a is turned on, the CPU 20 transmits the drive completion response signal to the power supply control unit 17 and the collation ECU 18 via the BUS line 27 as well as stopping the electric motor 10.

The power supply control unit 17 confirms the content of the drive completion response signal from the CPU 20, and interrupts the power supply to the CPU 20 if the lock operation is normally carried out. Accordingly, the "ESL power supply off" signal is input to the AND circuit 28.

The collation ECU 18 turns off the "motor power supply control signal" in correspondence to the drive completion response signal from the CPU 20. Accordingly, the AND circuit 28 outputs the off signal, and turns off the switching circuit 22. As a result, the power supply from the battery 23 to the motor drive relay circuit 19 is interrupted.

Figure 3:
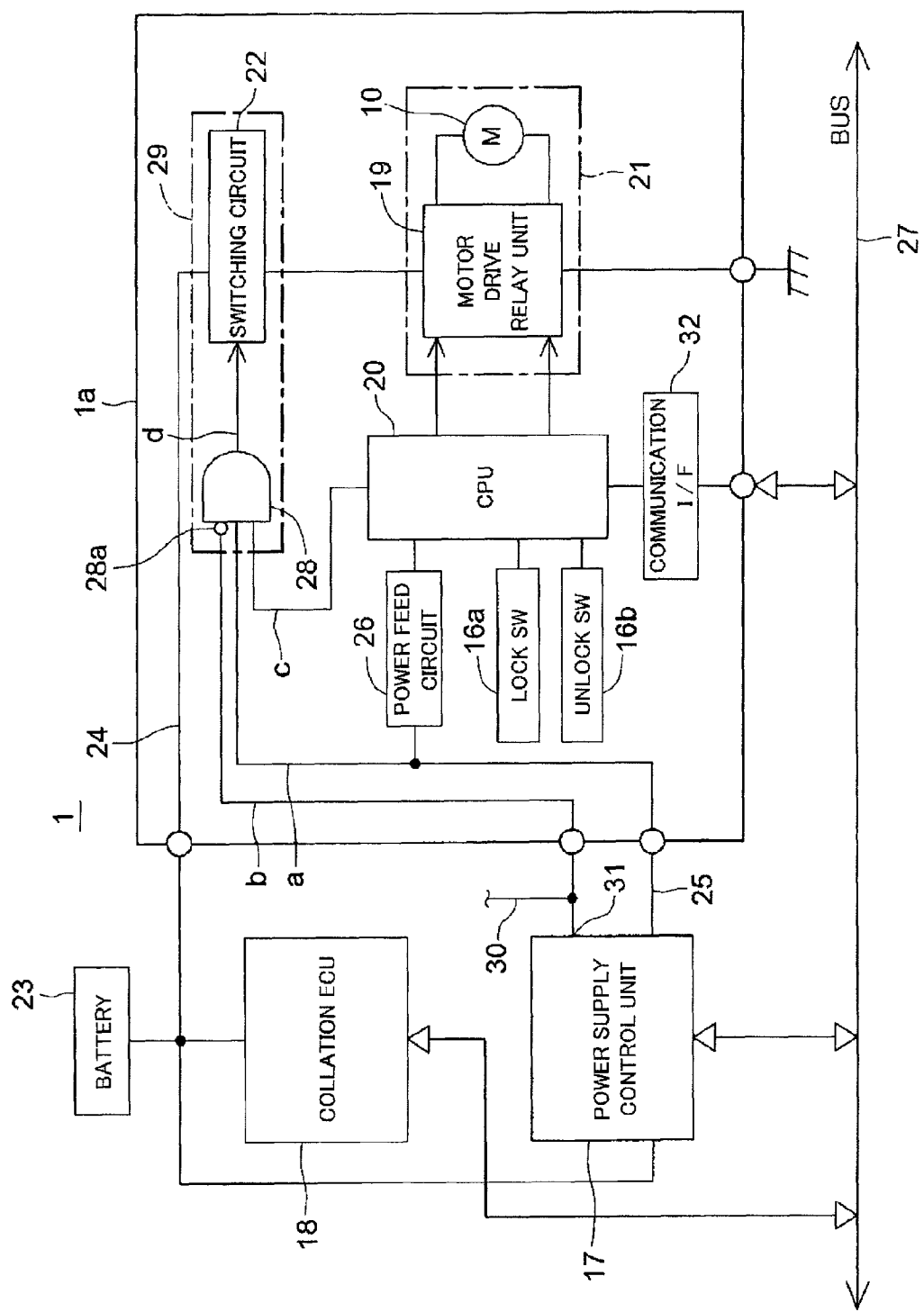
FIG. 3 is a circuit diagram of a motor-driven steering lock apparatus in accordance with a second embodiment.

FIG. 3 shows a circuit diagram of a motor-driven steering lock apparatus 1 in accordance with a second embodiment. Since the circuit is the same as the first embodiment in FIG. 2 except the matter that the input to the AND circuit 28 is carried out via the signal line c from the CPU 20 in place of the collation ECU 18, the same reference numerals are attached to the corresponding portions and a description thereof will not be given here.

In the second embodiment, when the CPU 20 receives the unlock demand signal from the power supply control unit 17 at a time of starting the engine, the CPU 20 outputs the "motor power supply control signal on" to the AND circuit 28 via the signal line c. Further, the "ESL power supply on" and "IG power supply off" signals are output to the AND circuit from the power supply control unit 17, the AND circuit 28 outputs the on signal to the switching circuit 22. Accordingly, the switching circuit 22 turns on, and the power supply is fed to the electric motor 10 from the battery 23. After completing the unlock operation, the CPU 20 turns off the "motor power supply control signal". Further, when the CPU 20 receives the lock demand signal from the power supply control unit 17 at a time of stopping the engine, the CPU 20 outputs the "motor power supply control signal on" to the AND circuit 22 via the signal line c, and turns off the "motor power supply control signal" after completing the lock operation.

In this second embodiment, even if the power supply control unit 17 gets out of order, so as to lie feeding to the CPU 20, the drive unit 21 is not fed until the CPU 20 outputs the "motor power supply control signal on". Further, even if the CPU 20 gets out of order and lie outputting the drive signal to the drive unit 21, the power supply is not fed to the CPU 20, and the drive unit 21 is not fed, unless the "ESL power supply on" of the power supply control unit 17 is output. As mentioned above, since the steering shaft is not locked during traveling of the vehicle unless a plurality of control means get out of order all together, it is possible to secure a high safety. Further, in the second embodiment, since it is not necessary to provide any input terminal of the signal line c from the collation ECU 18 in the motor-driven steering lock apparatus main body 1a, the second embodiment is effective in the case where it is desirable to reduce the input terminal because of a problem of a space or the like.

In the present embodiment, the power supply-enabling signal from the power supply control unit 17 is constructed as the ignition signal (IG power supply off signal), however, is not limited thereto. For example, the structure may be made such that an independent output portion from the IG output 31 feeding the IG power supply is provided in the power supply control unit 17, and the power supply-enabling signal is output to the AND circuit 28 from the output portion when a predetermined condition is satisfied.

What is claimed is:

1. A motor-driven steering lock apparatus provided with a lock bolt which is movable to a lock position engaging with a steering shaft of a vehicle and an unlock position releasing from the steering shaft, a driving means driving the lock bolt to the lock position and the unlock position, and a drive control means controlling the driving means, the motor-driven steering lock apparatus comprising:
   a host first control means having a feed line feeding a power supply to the drive control means;
   a host second control means carrying out a different control from the host first control means and the drive control means; and
   a switching means connecting and interrupting a power supply line from a battery based on a feed signal indicating a matter that the drive control means is fed from the host first control means via the feed line, a power supply-enabling signal from the host first control means, and a power supply-enabling signal from the host second control means,
   wherein the power supply line from the battery and the driving means are connected by the switching means only at a time when the feed signal from the host first control means to the drive control means, the power supply-enabling signal from the host first control means and the power supply-enabling signal from the host second control means are input to the switching means.

2. A motor-driven steering lock apparatus provided with a lock bolt which is movable to a lock position engaging with a steering shaft of a vehicle and an unlock position releasing from the steering shaft, a driving means driving the lock bolt to the lock position and the unlock position, and a drive control means controlling the driving means, the motor-driven steering lock apparatus comprising:
   a host first control means having a feed line feeding a power supply to the drive control means;
   a host second control means carrying out a different control from the host first control means and the drive control means; and
   a switching means connecting and interrupting a power supply line from a battery based on a feed signal indicating a matter that the drive control means is fed from the host first control means via the feed line, a power supply-enabling signal from the host first control means, and a power supply-enabling signal from the drive control means,
   wherein the power supply line from the battery and the driving means are connected by the switching means only at a time when the feed signal from the host first control means to the drive control means, the power supply-enabling signal from the host first control means and the power supply-enabling signal from the drive control means are input to the switching means.

3. The motor-driven steering lock apparatus according to claim 1, wherein the power supply-enabling signal from the host first control means is an ignition signal.

4. The motor-driven steering lock apparatus according to claim 2, wherein the power supply-enabling signal from the host first control means is an ignition signal.

* * * * *